Dec. 19, 1972    C. D. HUDSON    3,706,580
WOOD TREATING COMPOSTION
Filed May 25, 1970
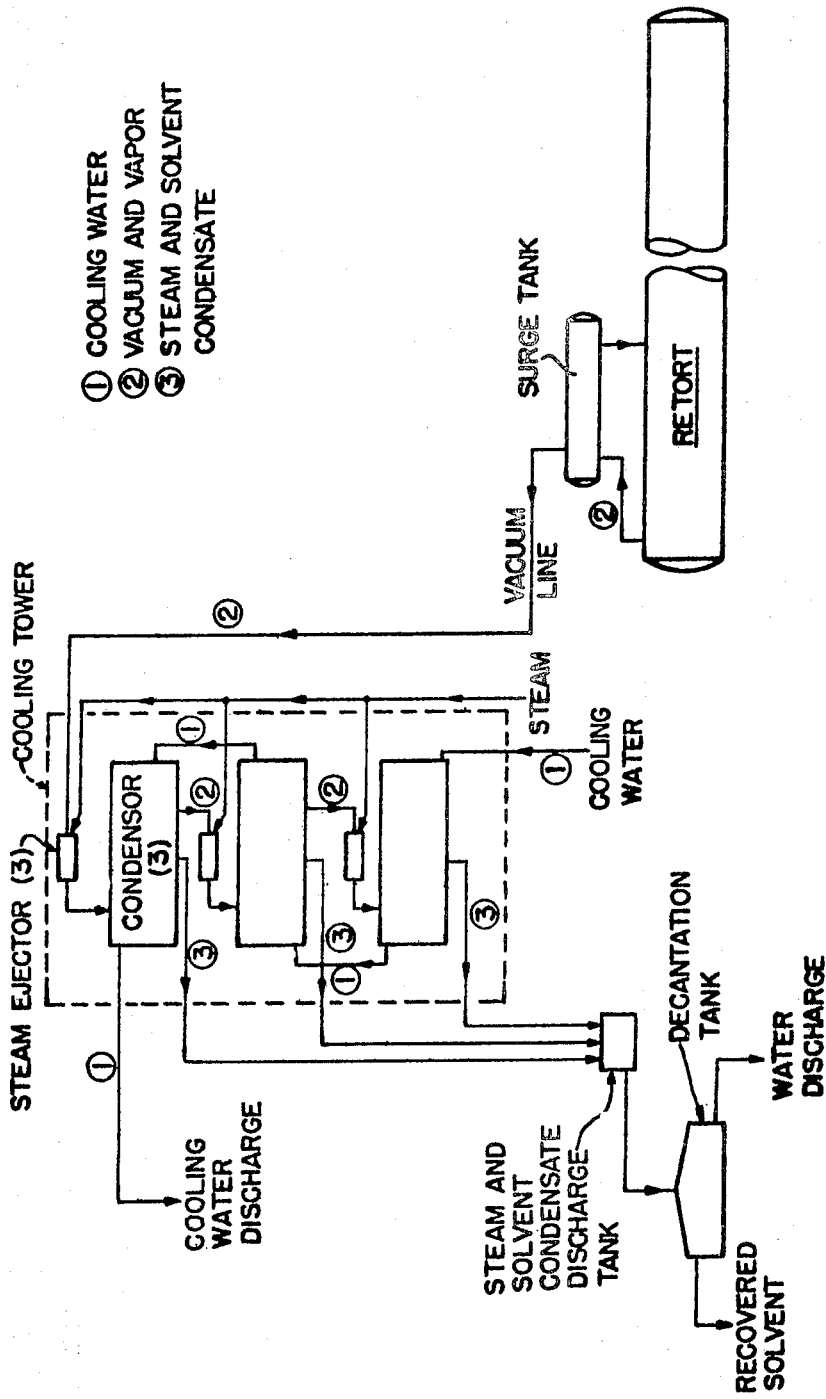

United States Patent Office 3,706,580
Patented Dec. 19, 1972

3,706,580
WOOD TREATING COMPOSITION
Charles D. Hudson, Seattle, Wash., assignor to
Wyckoff Company, Seattle, Wash.
Filed May 25, 1970, Ser. No. 41,140
Int. Cl. B27k 3/40; C09d 5/14
U.S. Cl. 106—15 AF                                    2 Claims

ABSTRACT OF THE DISCLOSURE

A wood preservative composition which substantially eliminates formation of pentachlorophenol crystals on the surface of the treated wood and results in increased paintability of the treated wood over compositions previously used consists of polypropylene glycol and a thermoplastic hydrocarbon resin derived from high temperature cracking of petroleum added to a solution of pentachlorophenol in a narrow boiling range mineral spirits solvent. Minor amounts of dioctylphthalate may be added which, along with the polypropylene glycol, prevent the formation of visible pentachlorophenol crystals on the surface of the treated product. Wood or other cellulosic materials are impregnated with the composition under pressure and the solvent carrier extracted and recovered from the wood before discharge of the wood from the treating chamber by a combination of heat and vacuum. The treated product, on removal from the treating chamber, is dry and clean to the touch with no "blooming" or formation of visible pentachlorophenol crystals on the surface of the wood.

BACKGROUND OF THE INVENTION

Field of the invention

This invention relates to a wood preservative composition and process for preserving wood.

Prior art relating to the disclosure

Numerous compositions are known for treating wood to render it water repellent and preserve it against attack from mold and micro-organisms which cause decay and stain. However, there are inherent disadvantages in the use of many of the compositions of the prior art, including such things as reduced paintability, seasoning checks in the wood and certain amounts of "blooming" or creep of the preservative to the surface of the wood wherein crystalline deposits are formed. Generally the known wood treating compositions contain polychlorophenols, such as pentachlorophenol, dissolved in a liquid aromatic hydrocarbon solvent or petroleum distillate along with additives for making the wood water repellent and/or preventing "blooming." For example, United States Patent No. 2,182,080 and United States Patent No. 2,182,081 disclose the addition of rosin or similar resinous substances to a solution of polychlorophenol dissolved in a solvent, the rosin or other similar resinous substance added to prevent "blooming."

U.S. Pat. No. 3,061,508 discloses the addition of certain petroleum hydrocarbon waxes to a solvent carrier containing polychlorophenols to reduce exudation of the preservative solution to the surface of the wood after treatment.

U.S. Pat. No. 3,376,144 is directed to the use of a composition of pentachlorophenol in a carrier solvent thickened with a mixture of micro-crystalline wax, a water soluble non-ionic surfactant and water.

U.S. Pat. No. 3,200,003 discloses a process and composition for impregnating wood, the impregnation solution containing 2% to 6% by weight pentachlorophenol dissolved in liquified petroleum gas and an isopropylether cosolvent.

SUMMARY OF THE INVENTION

The wood treating composition of this invention comprises a wood preservative, such as pentachlorophenol, dissolved in a narrow boiling range mineral spirits solvent. To the solution of pentachlorophenol in the solvent carrier are added a relatively small amount of polypropylene glycol as an anti-blooming agent and a thermoplastic hydrocarbon resin as a water repellent. Very small amounts of dioctylphthalate may be added to the composition to suppress "blooming." The hydrocarbon resin used is one which is completely compatible with paints, resins and varnishes and does not affect the paintability of the treated wood. The combination of polypropylene glycol and dioctylphthalate prevents formation of visible pentachlorophenol crystals on the surface of the treated wood. The wood is preserved by a process which includes the conventional step of impregnating the wood with the preservative composition under positive pressure. By the process of this invention, however, the solvent carrier is extracted from the wood before discharge from the treating chamber by a combination of heat and vacum. The solvent is recovered for reuse by condensation and decantation. The pentachlorophenol, anti-blooming agents and water repellent remain in the wood on extraction of the solvent carrier.

The wood treating composition and process of this invention provide (1) an economical means of treating wood against decay and stain, (2) a composition which virtually eliminates "blooming" or the formation of pentachlorophenol crystals on the surface of the treated wood, (3) increased paintability of the wood over prior processes using wax additives, (4) reduced season checks due to reduction in temperature used for moisture removal, and (5) reduced cost due to a unique solvent carrier and solvent recovery system.

It is a primary object of this invention to provide an improved wood preservative composition which substantially eliminates formation of pentachlorophenol crystals on the surface of the treated product.

It is a further object of this invention to provide an improved wood preservative composition which, when impregnated into the wood, does not affect the paintability thereof.

It is a further object of this invention to provide a wood preservative composition employing a solvent carrier which permits extraction thereof from the treated wood prior to discharge of the wood from the treating chamber.

It is a further object of this invention to provide a process for impregnatign wood with a preservative composition wherein the solvent carrier of the composition is extracted and recovered prior to discharge of the treated wood from the treating chamber, leaving pentachlorophenol and the additives of the wood preservative composition in the wood.

BRIEF DESCRIPTION OF THE DRAWING

The drawing shows a schematic flow diagram of the solvent recovery system.

DETAILED DESCRIPTION OF THE INVENTION

In accordance with the present invention the solvent carier for the wood impregnates is a petroleum distillate (1) which should have a distillation range of between 300° to 360° F. and preferably 300° to 350° F., (2) in which pentachlorophenol or other polychlorophenols used as wood preservatives are sufficiently soluble, (3) which can be recovered economically and (4) which forms an azeotrope with water at temperatures used in the recovery process. The preferred solvent carrier is a petroleum mineral spirits solvent having a boiling range of between about 300° and 360° F. The mineral spirits solvent is made up predominately of aliphatic hydrocarbons. The solubility of pentachlorophenol in the preferred solvent carrier may not be sufficient for injection of sufficient pentachlorophenol into the wood to obtain the desirable preservative characteritics. Thus, a cosolvent having a boiling point approximating and preferably within the distillation range of the carrier solvent is preferably added, the cosolvent capable of dissolving sufficient pentachlorophenol to inject sufficient amounts into the wood. Cosolvents which may be used include such compounds as xylene and cyclohexanone, cyclohexanone being preferred.

To the solvent carrier is added pentachlorophenol in amounts ranging from 2 to 11% by weight based on the weight of the total solution and preferably 3 to 6% by weight. Sufficient cosolvent should be added to the mineral spirits solvent carrier to dissolve the requisite amount of pentachlorophenol.

To suppress and substantially eliminate "blooming" or the formation of visible pentachlorophenol crystals on the surface of the treated cellulosic product polypropylene glycol or a combination of polypropylene glycol and dioctylphthalate is added to the solution of pentachlorophenol in the solvent carrier. The addition of polypropylene glycol to which very small amounts of dioctylphthalate have been added, both reduces the amount of polypropylene glycol which would normally be used and appears to interact to effect attachment of the pentachlorophenol to the wood. The amount of polypropylene glycol added to the solution of pentachlorophenol in the solvent carrier may range from 1 to 5% by weight based on the weight of the total solution and preferably from 2 to 3%. Greater amounts of polypropylene glycol appear to affect the paintability of the treated wood. The preferred polypropylene glycol compounds have a maximum viscosity of 45 SUS @ 100° F. as determined by ASTMD 88. Dioctylphthalate may be added in amounts ranging from 0.06 to 0.5% by weight based on the total weight of the solution. The addition of as little as ⅛ of 1% dioctylphthalate along with polypropylene glycol is effective to prevent blooming.

Water repellent chemicals are preferably added to the treating composition of this invention. Waxes and paraffins soluble in the solvent carrier have generally been used in prior treating compositions but these substances tend to reduce the paintability of the treated wood. The water repellent additive used in the composition of this invention is completely compatible with paints, varnishes, stains, etc., is readily soluble in the solvent carrier, and is compatible with the other materials making up the composition. The additive is a thermoplastic hydrocarbon resin derived from the high temperature cracking of petroleum. These resins are commercially available and sold under the trade name Piccopale by Pennsylvania Industrial Chemicals, Inc. These resins are made up of a mixture of straight chain hydrocarbon resins in which considerable cyclic but no aromatic structures are present. The preferred resin of this type is sold under the trade name Piccopale 100 and has a melting point of about 100° C. and a molecular weight of approximately 1400. Other resins of this type having melting points ranging from 70° C. to 100° C. and molecular weights ranging from 800 to 1500 may be used. The amount of water repellent added to the treating composition may vary from 0.25 to 5% and preferably from 0.50 to 1% by weight based on the total weight of the solution. Too great an amount of water repellent additive tends to increase the possibility of blooming.

PROCESS

The process of this invention effects permanent retention of the preservative and additives to the wood treated. Exudation of the pentachlorophenol to the surface of the treated product caused by migration of residual solvent retained in the treated product is not a problem. The solvent carrier of this invention is extracted from the treated wood after impregnation of the preservative and additives into the wood before removal of the wood from the treating chamber. The solvent is recovered and re-used, thus making the overall process economically attractive. Special air drying or kiln seasoning for the purpose of removing residual solvent carrier in the treated product is not required. Season checks are reduced as the seasoning process of this invention is carried out at a lower temperature than either vapor drying or Boulton drying, two of the most commonly used processes for removing moisture from wood.

The wood to be impregnated is enclosed in a hermetically sealed retort or treating chamber. The particular species of wood or its configuration is not critical to the process of this invention. The retort is filled with the treating solution of this invention. The amount of treating solution used is not particularly critical. Generally enough solution is used to completely cover the wood to be treated. The retort has steam coils or other heating means provided therein for heating the solution.

Referring to the schematic flow diagram of the solvent recovery process, the retort or treating chamber can be evacuated by means of steam ejectors. Three stages of steam ejection are shown but fewer or more stages may be used if necessary. With the three-stage steam ejector system shown it is possible to pull a vacuum of about 0.5 p.s.i. absolute.

If green wood is to be treated, the green wood in the retort is submerged in the treating solution and subjected to a combination of heat and vacuum (about 1.5 p.s.i. absolute) to remove the moisture in the wood. The temperature of the treating solution is adjusted to form a mineral spirits/water azeotrope. With the preferred mineral spirits solvent carrier a temperature of 170° F. to 190° F. is sufficient. The combination of heat and vacuum to remove the moisture in the wood is continued until the moisture content of the wood has been reduced to the desired amount. When this point is reached the vacuum is broken and the treating solution injected into the wood by hydraulic pressure or gas pressure. Generally a hydraulic pressure of 100 to 135 p.s.i. is used although this is not critical.

If dry wood is being treated the seasoning step discussed above is not necessary. In this instance the wood to be treated is covered with the treating solution and the treating chamber pressured to a hydraulic pressure of 100 to 135 p.s.i. and heated to a temperature sufficient to effect impregnation of the wood with the treating solution. The temperature should also be above the vaporization temperature of the mineral spirits solvent and water. Generally a temperature of 190 to 200° F. is employed. The amount of preservative impregnated or injected into the wood is measured by a flow meter or by a tank gauge or both.

When impregnation is complete the hot treating solution in the treating chamber or retort is withdrawn through one condensers which cool the solution below its flash point. The cooled solution is then delivered into a closed storage tank. Neither the condensers nor the storage tank is shown in the schematic. The condensers into which the hot treating solution flows are preferably fitted with a valve which prevents passage of treating solution to the storage tank when not cooled below its flash point. This is essentially a safety feature.

Steam to the ejectors is turned on after removal of the treating solution from the treating chamber to evacuate the chamber. Sufficient heat from the impregnation step remains in the treating chamber so that residual solvent carrier therein is essentially in the vaporous state. During heating and evacuation of the treating chamber excess solvent contained in the wood is extracted. Each of the steam ejectors (three being shown in the schematic flow diagram) is provided with a condenser which cools and condenses the mineral spirits/water azeotrope by means of cooling water or other coolant. The steam and solvent carrier condensate from the condensers collect in a discharge tank and from there is received in a decantation tank. Below about 80° F. the water and mineral spirits solvent carrier separate into two distinct phases. The solvent is recovered from the decantation tank and reused while the water is discharged.

When extraction of the solvent carrier from the wood treated in the retort is complete the vacuum is broken, the retort opened and the wood removed. The treated wood removed from the treating chamber is dry and clean to the touch with no formation of visible pentachlorophenol crystals on the surface of the wood. There is no necessity to subject the treated wood to aromatic solvent baths, caustic washes, or detergent scrubbings which tend to remove pentachlorophenol from the wood and thereby reduce the preservative quality. The color of the wood after treatment is virtually the same as the color of the material before treatment. The paintability of the treated wood is essentially the same as dry wood before treatment. Paint has been applied to wood treated according to this invention as quickly as four hours after removal from the treating chamber with drying time less than 24 hours. The wood treating composition and process of this invention offers an economical means of preserving wood with an improved treating composition.

The embodiments of the invention in which an exclusive property or privilege is claimed are defined as follows:

1. A wood preservative composition which substantially eliminates formation of pentachlorophenol crystalline deposits on the surface of the wood treated, is compatible with paint, resins and varnishes and does not affect the paintability of the wood treated, consisting essentially of:

2 to 11% pentachlorophenol,
  a combination of 1 to 5% polypropylene glycol and 0.06 to 0.5% dioctylphthalate to substantially prevent formation of pentachlorophenol crystalline deposits on the surface of the treated wood,
  0.25 to 5% thermoplastic hydrocarbon resin soluble in the solvent carrier and made up of a mixture of straight chain hydrocarbons in which considerable cyclic but no aromatic structures are present, the resin having a melting point of from 70° to 100° C. and an average molecular weight of from 800 to 1,500, all dissolved in an aliphatic hydrocarbon petroleum distillate having a distillation range between about 300° F. to 360° F. and a co-solvent selected from the group consisting of xylene and cyclohexanone.

2. The composition of claim 1 wherein the polypropylene glycol has a viscosity of 45 SUS at 100° F. as determined by ASTMD 88.

References Cited

UNITED STATES PATENTS

| | | | |
|---|---|---|---|
| 3,376,144 | 4/1968 | Stutz | 106—15 AF |
| 2,182,081 | 12/1939 | Hatfield | 424—347 |
| 2,737,458 | 3/1956 | Burnham | 106—15 AF UX |
| 2,532,489 | 12/1950 | Ferguson | 106—15 AF |
| 3,200,003 | 10/1965 | Bescher | 424—347 X |
| 2,182,080 | 12/1939 | Hatfield | 424—347 |

OTHER REFERENCES

"Piccopale" by Pennsylvania Industrial Chemical Corp., Clairton, Pa., 8 pages, Patent Office Date August 1959.

The Condensed Chemical Dictionary, seventh edition, D. Van Nostrand-Reinhold Co., New York, N.Y., 1966, pp. cover and 632.

DONALD J. ARNOLD, Primary Examiner

J. B. LOWE, Assistant Examiner

U.S. Cl. X.R.
106—239; 117—149